United States Patent [19]
Garrett

[11] 3,803,626
[45] Apr. 9, 1974

[54] ENVIRONMENTAL DISTORTION MEASUREMENT OF CURVED ANTENNA DISHES

[75] Inventor: Abram J. Garrett, Canoga Park, Calif.

[73] Assignee: The United States of America as represented by the Secretary of the Navy., Washington, D.C.

[22] Filed: Apr. 30, 1973

[21] Appl. No.: 356,070

[52] U.S. Cl............... 343/894, 343/17.7, 356/237, 350/292
[51] Int. Cl. ......................................... H01q 19/00
[58] Field of Search.................. 343/17.7, 703, 894; 356/237; 350/292

[56] References Cited
UNITED STATES PATENTS
3,164,835  1/1965  Alsberg............................. 343/703
3,343,445  9/1967  Norman................................... 88/1

Primary Examiner—Eli Lieberman
Attorney, Agent, or Firm—Richard S. Sciascia; Joseph M. St. Amand; David O'Reilly

[57] ABSTRACT

A system for measuring the effect of deformation of an antenna parabolic reflector dish on the feedhorn focal point location. A plurality of equally spaced tiny mirrors attached to the parabolic reflector in a concentric circle reflects light onto a photographic plate mounted in front of the feedhorn focal point. The photographic plate contains a predrawn target circle which represents the projected focal point determined from the selected placement position of the tiny mirrors on the parabolic dish. A bore sight apparatus is used to align the parabolic dish with a light source, such as the sun. Spots, representing images of the sun reflected from the tiny mirrors, are recorded on the photographic plate when it is exposed. For a true parabola, the sun images produced by the tiny mirrors on the photographic plate should, theoretically, all fall on the target circle. Thus, any sun images on the photographic plate displaced from the target circle are an indication of distortion of the parabolic dish due to environmental changes.

14 Claims, 8 Drawing Figures

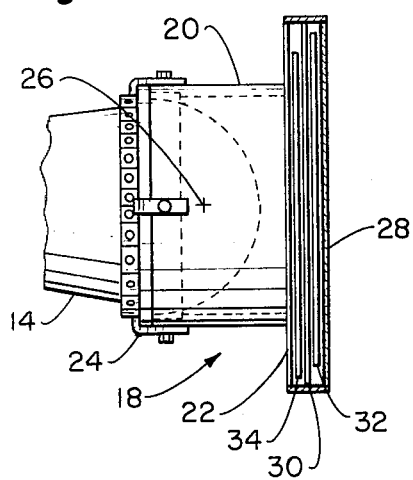
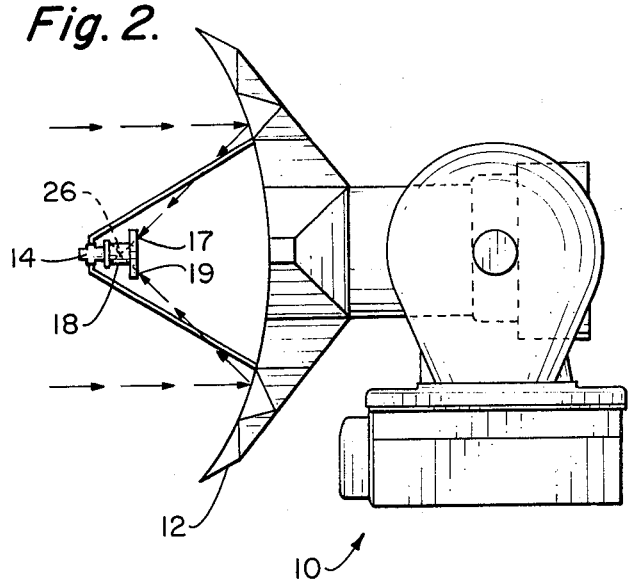
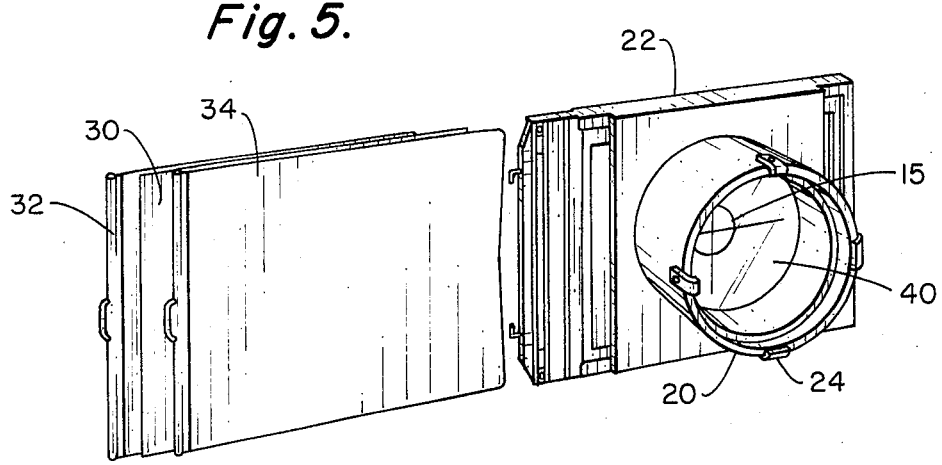
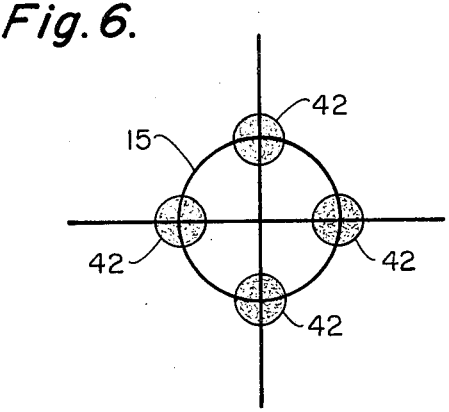
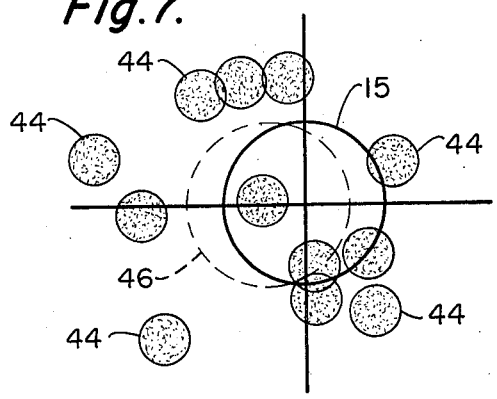

ENVIRONMENTAL DISTORTION MEASUREMENT OF CURVED ANTENNA DISHES

BACKGROUND OF THE INVENTION

This invention relates to a method and apparatus for measuring the distortion of antennas due to environmental influences and more particularly relates to measurement of distortion by using reflected light.

Heretofore there has been no known method for accurately measuring the distortion of antennas due to environmental influences. With the high degree of accuracy now required in tracking satellites, any distortion in the antenna produces errors in the data reduction process which cannot be tolerated. Thus, it is imperative that some system be provided for measuring the distortion in order to increase the efficiency of the antennas and improve the accuracy of tracking data.

There are systems for accurately measuring the curvature of a parabolic antenna when it is being fabricated, but these systems are very complicated and difficult to use and would be of little use in the field. Also, there are systems for measuring deflection by the reflectoon of light but, heretofore it has not been used to measure distortion of surfaces the manner described herein.

The present invention provides a new method which is simple, inexpensive and accurate to use on any size antenna involving a curved dish and feedhorn system combination. The data obtained in the field is easy to measure, interpret, and easy to reduce. The use of the method described herein will provide information not known before. It will provide the personnel operating the antenna with an indication of system performance of the dish-feedhorn relation during environmental changes occurring in the field.

SUMMARY OF THE INVENTION

The purpose of this invention is to measure the antenna dish surface deformation effects on the feedhorn focal point location on the tracking data collected by an antenna. The information provided by the present invention can be used to make corrections on radar operation tracking data after measuring the error introduced by the antenna dish surface deformations caused by the environment.

The system and method of the present invention provides information as to the distortion of antenna dishes due to environmental changes by reflecting light from mirrors attached to the antenna dish and collecting the light on a photographic plate. Any deflection of the reflected light from the true focal point can be determined from the photographic plate. A plurality of equally spaced tiny mirrors are accurately attached in a concentric fashion on the antenna dish and the light reflectd from these mirrors is collected on a photographic plate attached to the feedhorn. Since the photographic plate is attached to the feedhorn in front of the focal point, the projected focal point will be a circle. Any light reflected from the tiny mirrors which does not fall on the ideal circle representing the projected focal point indicates distortion in that area of the antenna. The recorded spots enable the determination of any misalignment of the radar reflector relative to the feedhorn.

The method of this invention provides a means of measuring the actual surface deformation of a reflector accurately enough so that the degree of conformance with specifications can be evaluated or to provide the data required to adjust the feedhorn focal point to an acceptably accurate position. A light source aimed at the radar dish with a plurality of equally spaced mirrors placed concentrically on the reflector surface will reproduce concentric sun images on the photographic paper which coincide with the circle representing the projected focal point if the feedhorn-reflector conditions are ideal.

OBJECTS OF THE INVENTION

It is one object of this invention to provide an uncomplicated system for measuring distortion in an antenna dish due to environmental changes.

It is another object of the present invention to provide a method which is fast, accurate, and versatile for measuring surface conformity of an antenna dish.

Yet another object of the present invention is to provide a means for measuring the actual surface deformation of a reflector accurately enough so that the degree of conformance with specifications can be evaluated.

Still another object of the present invention is to provide the data required to adjust the feedhorn focal point to an acceptably accurate position.

Still another object of the present invention is to provide a system for measuring distortion of the antenna with negligible load on the structure which does not affect the surface of the antenna dish by the measuring process.

Yet still another object of the present invention is to provide a method and system whereby instantaneous dynamic deformations may be determined with the antenna dish in any desired orientation by making use of electronic flash units to illuminate the reflector dish at the proper instant.

Yet still another object of the present invention is to provide a method which produces permanent records of antenna dish deformation due to environmental changes which can be used to correct errors in tracking data.

Other objects, advantages, and novel features of the invention will become apparent from the following detailed description of the invention when considered in conjunction with the accompanying drawings wherein like reference numbers identify like parts throughout the drawings.

BRIEF DESCRIPTION OF THE DRAWINGS

FIG. 2 is a side elevation of the antenna system illustrating how the projected focal point results in a circle.

FIG. 3 illustrates the manner in which the photographic plate is attached to the feedhorn.

FIG. 5 is an illustration of the photographic film holder.

FIG. 6 is a diagram illustrating the images which would be produced by four equally spaced mirrors placed concentrically on the reflector surface, if the feedhorn-reflector conditions were ideal.

FIG. 7 is an illustration of an actual image pattern produced by a plurality of tiny mirrors and indicates the center of the optimum energy concentration.

DETAILED DESCRIPTION OF THE PREFERRED EMBODIMENT

Figure 1:
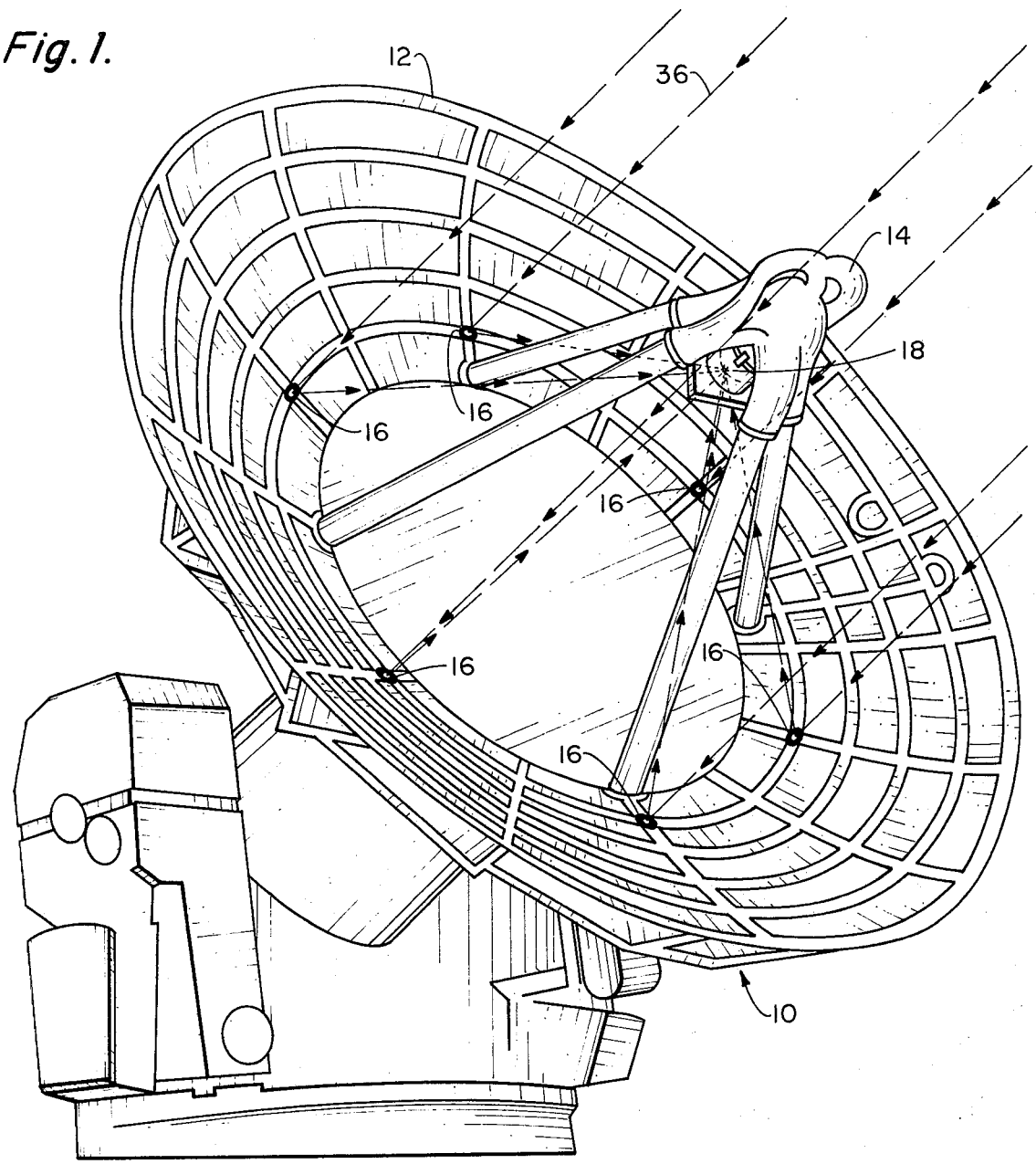
FIG. 1 is a perspective view of an antenna system having a plurality of tiny mirrors attached to the antenna dish and the photographic plate attached to the feedhorn.

The theory behind the development of the present invention is that the use of tiny mirrors placed at precise positions on the radar reflector, as shown in FIG. 1, enabled the determination of any misalignment of the radar reflector relative to the feedhorn due to mechanical stresses or environmental changes. The technique provides a means of measuring the actual surface deformation of a reflector accurately enough so that the degree of conformance with specifications can be evaluated or to provide the data required to adjust the feedhorn focal point to an acceptably accurate position. The information collected from the system may also be used to correct errors in data collected during tracking.

In FIG. 1, there is shown a plurality of tiny mirrors accurately placed at precise positions on a reflector of a parabolic radar antenna. The system was actually tested on an AN/FPS-16 instrumentation radar. The mirrors are placed so that when the antenna is aligned with a high intensity light source the reflected light will all converge at the focal point of the reflector dish. The number of mirrors used depends upon the dimensions of the reflector dish and the avoidance of confusion of the light reflected and recorded from the tiny mirrors.

Referring now to FIG. 1, there is shown a radar system generally at 10 which has a reflector 12 and a feedhorn 14 mounted on the reflector. Small mirrors 16 are attached to the reflector at various positions. The mirrors 16 may be attached to the reflector permanently or temporarily in any suitable manner. The number of mirrors illustrated in FIG. 1 is 6; however, any number may be used within the limitations of the target circle on the photographic plate. Actually, in the tests performed, a number of mirrors were used varying from four up to 12. The mirrors are concentrically attached to the reflector 12 and accurately positioned to reflect on the focal point. The accurate position is determined from the actual dimensions of the parabolic surface of the antenna reflector 12.

A film holder mounting assembly 18 is attached to the feedhorn as shown more clearly in FIGS. 2 and 3. FIG. 2 shows the film holder mounting assembly 18, attached to the feedhorn 14 with the photographic plate actually slightly in front of the focal point of the parabolic reflector. Thus, the focal point 26, when projected to the plane of the photographic film, produces a target circle 15 (FIG. 5) because energy reflected from the antenna dish would intersect the plane as shown at 17 and 19. The film holder mounting assembly 18 is attached to the feedhorn, as shown in FIG. 3, and is comprised of a cylindrical collar 20 to which is attached a rectangular film holder 22. The collar 20 fastens to the feedhorn with brackets 24.

The rectangular film holder has a shade number 12 dark glass prism 28, in front of the film 30. This dark glass prism 28 shields the film from surrounding light and only permits light of very high intensity to to be recorded on the film. The film 30 fits into a slot in the film holder behind the dark glass prism 28. The photographic film 30, housed in the film holder 22, is blocked from light by two sliding black plates 32 and 34, as shown in FIG. 5. When the sliding black plate 32, between the photographic film 30 and the dark glass 28, is removed, only the intense light reflected by the tiny mirrors is registered on the photographic film. The optimum exposure time to sunlight was found to be approximately one minute because the motion of the earth begins to cause the recorded spots to become elliptical. The film is supported in the film holder 22 in front of the focal point 26 of the reflector for two purposes: first, the photographic apparatus can be attached to the feedhorn structure without disturbing the focal point setting of the comparator; and second, the projected focal point then results in an ideal target circle 15 from which the deviation of the recorded spots can be easily determined.

Figure 4A:
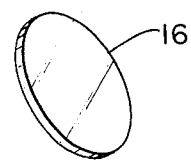
FIGS. 4a and 4b illustrate the manner in which the tiny mirrors to be attached to the antenna dish are to be produced.
Figure 4B:
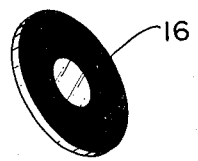

The tiny mirrors 16 were made from ½ inch diameter inspection-type instrument mirrors, shown in FIG. 4a, and were masked, as shown in FIG. 4b, to provide a one-eighth inch diameter reflecting surface. The tiny mirrors are attached with a special adhesive to the parabolic radar antenna dish and are accurately placed in a concentric fashion.

After the mirrors 16 are in place and the photographic film 30 is attached to the feedhorn with the film holder assembly 18, the system is put into operation by focusing the reflector 12 on a high intensity light source (indicated by arrows 36 in FIG. 1). In practice, the light source to be used can be the sun, a laser beam, or an electronic flash light. Sunlight is preferred because it is readily available at no cost and its intensity is high compared to that of any other source. The alignment with the sun, or other light source, is accurately made with the aid of a bore sight apparatus attached to the reflector support in a manner known in the art. Once the antenna reflector 12 is properly aligned with the light source, the black plate 32 between the photographic film and the dark glass is removed, exposing the film to the high intensity light reflected from the tiny mirrors 16, which produces spots on the photographic film. The dark glass 28 shields the photographic film from surrounding light and only permits the high intensity light reflected from the tiny mirrors 16 to be recorded. The interface between the dark glass 28 and the photographic film 30 consists of a clear plastic pane 40 (FIG. 5) approximately one-sixteenth inch thick. On this transparent sheet 40, the projected focal point is an ideal target circle 15 whenever the photographic plane is in front of the actual focal plane. This circle 15 is predrawn accurately with India ink on the plastic transparent sheet, as shown in FIG. 5. The radius of this target circle 15 is determined from the selected placement position of the tiny mirrors 16 on the parabolic reflector dish 12. For a true parabolic dish, the sun images reflected by the mirrors on the photographic film will fall on the circumference of the circle.

Theoretically, a continuous circle of mirrors one-eighth inch thick would describe a circle on the film. With this circle described on the film paper as the boundary within which all the sun spots would ideally fall, one is able to measure displacement of those spots which fall inside or outside of the ideal circle.

FIG. 6 is a diagram illustrating how four mirrors concentrically placed on a true parabolic dish would produce spots 42 falling on the ideal circle. The circle 15, described above, represents the sun rays which would fall on the ideal focal point, if it were possible to place the film paper on the plane perpendicular to the parabola axis and passing through the focal point 26. Therefore, sun spots falling inside this ideal circle represent sun spots that fall in front of the focal point, and those falling outside the circle represent sun spots that fall behind the focal point.

FIG. 7 is a diagram of an actual pattern produced by 12 mirrors accurately placed on the reflector dish of an AN/FPS-16 radar. Each circle 44 represents one recorded sun spot. The solid circle 15 represents the ideal circle while the dotted circle 46 called "the circle of least confusion" defines the center of the optimum energy concentration. Since this pattern of dots represents a statistical array of points that yield the average centroid of these dots, the average values of the errors determine the location of circle 46 relative to the parabolic axis. This average can be used to either correct the feedhorn location or used to reduce to data for correcting errors in tracking data.

In order to preserve this information for later use in correcting tracking data, the temperature of the radar reflector may be recorded by thermocouples attached at one or more positions to the reflector 12. In addition, it may be advantageous to attach strain gauges to the reflector dish 12 to record the stresses during operation of the radar. In this manner, the amount of deviation of reflected signals from the radar antenna dish 12 may be determined for particular environmental conditions. This data, when reduced, can later be used to correct errors in tracking data.

The experimental data acquired in the field may be used to represent the statistical results which characterize the radar during environmental changes caused by wind, inertial loads, and temperature variations. From each tiny mirror 16 attached to a specified location on the radar dish 12, a value representing the energy efficiency may be obtained. With a plurality of such mirrors used, a statistical average of the energy efficiency may be obtained revealing under what conditions of wind, inertial loads, and temperature the optimum efficiency and performance of a certain radar reflector dish is possible. By the use of the least squares method, the position of the dotted circle 46 in FIG. 7 can be determined very precisely.

Thus, there has been disclosed a novel system and method for determining the deformation of an antenna reflecting dish due to environmental changes. The same technique described herein that applies to the parabolic radar dish may also be used on cylindrical type radar dishes in determining if the shape conforms to the ideal configuration. Further, permanent micromirrors can be placed at precise, predetermined stations on the parabolic dish surface together with a film holder on the feedhorn to perform random optics, discontinuity measurements and ceck surface conformities before and after tracking operations, if desired. Another alternative would be to provide a multiple channel temperature recorder attached to the radar pedestal to continuously monitor temperatures of the radar dish structure over a 24-hour period and simultaneously correlate these temperatures with the photographic patterns taken at the feedhorn. Temperature readings taken alone, after the correlation is established, may then be used to define the feedhorn-reflector relation. The system could also be used to perform dynamic tests of the radar by the use of electronic flashers whose plane holder is placed at various angles relative to the ground and is made to trigger whenever the axis of the parabolic dish becomes perpendicular to it. These tests may be performed on sunny days, cloudy days, or during night. This technique would record the effects to the structure of dynamic loading deformation.

Obviously, many other modifications and variations of the present invention are possible in the light of the above teachings. It is therefore to be understood that within the scope of the appended claims the invention may be practiced otherwise than as specifically described.

I claim:

1. A system for measuring deformations of an antenna reflector in combination with a feedhorn, due to environmental conditions, comprising:
   a plurality of tiny mirrors attached to the reflector at predetermined positions and adapted to reflect light which converges at the focal point of the antenna reflector;
   means for recording the images produced by light reflected from the tiny mirrors;
   means for mounting the image recording means adjacent to the focal point of the feedhorn; and
   means for measuring the displacement of the recorded images from the feedhorn focal point so that errors due to distortion of the reflector may be determined.

2. The distortion measuring system of claim 1 wherein said plurality of mirrors is equally spaced and concentric with the antenna reflector.

3. The distortion measuring system of claim 2 wherein said means for recording the reflected light comprises a photographic film.

4. The distortion measuring system of claim 3 wherein said means for mounting the photographic film adjacent to the feedhorn focal point comprises:
   a rectangular film holder; and
   a cylindrical collar attached to the film holder, adapted to be fastened to the feedhorn structure whereby the plane of the photographic film is in front of the feedhorn focal point.

5. The distortion measuring system of claim 4 wherein the rectangular film holder is comprised of:
   a dark glass prism in front of the photographic film;
   a removable black plate between the dark glass prism and photographic film; and
   a transparent plastic sheet having an ideal target circle permanently predrawn thereon interfaced with the photographic film.

6. The distortion measurement system of claim 5 wherein each of the tiny mirrors has a reflecting surface approximately one-eighth inch in diameter.

7. The distortion measuring system of claim 6 wherein the plurality of tiny mirrors is permanently attached to the antenna reflector.

8. The distortion measurement system of claim 7 wherein the plurality of tiny mirrors comprises 12 mirrors equally spaced on a circle concentric with the reflector.

9. A method of measuring the distortion of an antenna reflector in combination with a feedhorn comprising:
   attaching a plurality of tiny mirors to the antenna reflector at predetermined positions;

aligning the antenna with a high intensity light source;

recording the light images reflected from the mirrors;

measuring the displacement of the recorded images from the true focal point of the feedhorn; and averaging the displacement of the recorded images to determine the optimum concentration of reflected energy.

10. The method of claim 9 wherein the step of attaching a plurality of mirrors comprises equally spacing the mirrors on a circle concentric with the reflector.

11. The method of claim 10 wherein the step of recording the reflected light images comprises:

attaching a photographic film adjacent to the feedhorn focal point; and exposing the photographic film for a predetermined length of time.

12. The method of claim 11 wherein the step of exposing the film includes shielding the film with a dark glass prism to exclude surrounding light.

13. The method of claim 12 wherein the step of aligning the antenna with a light source comprises aligning the antenna with the sun.

14. The method of claim 13 wherein the photographic film is exposed for approximately 1 minute.

* * * * *